UNITED STATES PATENT OFFICE.

HERMANN PLAUSON, OF HAMBURG, GERMANY.

MANUFACTURE OF VINYL HALIDES.

1,425,130.  Specification of Letters Patent.  Patented Aug. 8, 1922.

No Drawing.  Application filed January 13, 1921. Serial No. 437,109.

*To all whom it may concern:*

Be it known that I, HERMANN PLAUSON, Esthonian subject, residing in Hamburg, Germany, have invented certain new and useful Improvements in the Manufacture of Vinyl Halides, of which the following is a specification.

This invention relates to the manufacture of addition compounds of vinyl alcohol with mineral or organic acids. The mineral acids will be considered first.

It is known that the addition of hydrobromic acid to acetylene takes place extremely slowly at about 100° C. under ordinary pressure (Reboul, J. 1852 page 304). Only small quantities of ethylidene bromide are formed even after several days. Similarly hydrochloric acid cannot be added to acetylene. According to the experiments of Ssabanjeff these addition products can be obtained by using acetylene compounds (copper actylide) but this method is not technically practicable.

Suggestion has been made to increase the reaction velocity by the addition of catalysts but without giving satisfactory yields.

According to the present invention, it has been found that hydrochloric acid gas for instance will react with acetylene without using catalysts under an increased pressure of 1—2 atmospheres, at a temperature of 100—120° C. giving vinyl chloride smoothly and with a good yield. It has further been shown by experiment that by increasing the pressure and/or raising the temperature or by increasing the time of reaction, it is possible to obtain not only vinyl halides but also polymerization products thereof.

If inert gases such as nitrogen or inert liquid vapours such as benzene, benzine, petroleum or ether are employed as diluents the pressure can be increased further.

As mentioned above it has previously been proposed to accelerate this reaction by the use of catalysts for instance mercury compounds and in connection with the use of such catalysts allusion has been made to the possibility of increasing the pressure but in such cases the reaction took place by virtue of the catalysts added and it could not have been foreseen that the addition of halogen hydrides to acetylene would take place without the aid of catalysts at several atmospheres superpressure, especially since it is known that under these conditions acetylene alone is liable to explode violently especially at fairly high temperatures.

It is known that hydrobromic acid adds on to acetylene without the use of pressure. In such cases the process of the present invention has the following effect: The application of pressure favours the formation of the monobrom compounds of the type R.CH:CBr.R, while according to Wislicenus (Annalen volume 250, p. 232 and volume 313, p. 222) the reaction at ordinary pressures always gives higher brominated compounds of the type R.CH$_2$.CBr$_2$.R (i. e. without a double bond and not containing the vinyl group), in addition to the vinyl compounds of the above type. Such other compounds are not obtained according to the process of this invention. The bromvinyl compounds, like the chlor compounds, can be quantitatively and smoothly polymerized in one operation by increasing the pressure and/or temperature.

A very important feature of the invention is the manufacture of the stable polymerization products (hereafter termed polymers) from the unstable vinyl halides in a single operation. If the vinyl halides are isolated and purified, as has been hitherto necessary, considerable losses take place. It has been proposed to polymerize pure vinyl halides by the action of ultra-violet rays or by heating under pressure, but according to the present invention it is possible to prepare the polymers direct from acetylene hydrocarbons and halogen hydrides. This is a very great technical advantage as it represents a substantial simplification and improvement in the manufacture of these important and valuable products.

Still less could it have been foreseen that the vinyl compounds so obtained could be further polymerized in a single operation.

According to the present invention however both the formation and the further polymerization of the vinyl compounds is possible in such manner that operations on the large scale may be readily performed as will be seen by consideration of the following examples.

*Example 1.*

26 parts by weight of acetylene and 36.5 parts by weight of hydrochloric acid gas both previously purified and dried, are mixed and forced by a compressor into an autoclave at 1—2 atmospheres pressure and heated to 100—120° C. for 10—24 hours. A yield of up to 30—35 parts by weight of vinyl chloride and 3—6 parts by weight of a higher condensation product is obtained. The vinyl chloride so obtained is washed with alkaline water to combine with the free hydrochloric acid and after drying over calcium chloride it is liquefied in a freezing mixture and further purified from acetylene by distillation at 20° C. when it is preserved in bombs.

But if the mixture is first heated as above and then heated a further 10 hours to 150—200° C., a yield of 36—37 parts by weight of polymerized vinyl chloride product and about 21 parts by weight of vinyl chloride is obtained. By still further heating, up to 90% of the vinyl chloride can be transformed into the polymerized form. The polymerization can take place in a few hours if the pressure is gradually increased at the above mentioned temperature by introduction of nitrogen.

It is possible therefore to polymerize the first-formed vinyl halides at a fairly high temperature and a fairly low pressure or a fairly low temperature and a fairly high pressure during a suitable period of time.

The reaction time can be decreased by increasing the pressure but it is advisable not to exceed 15 atmospheres. If however the pressure is generated by an inert diluent such as nitrogen the pressure can be raised to 50 atmospheres since the acetylene does not exhibit explosive properties in this case. The condensation process takes place even at a temperature of about 50° C., and indeed also at ordinary temperatures, but slowly in this case. In working on the large scale, the condensation vessel is conveniently filled with porous masses such as kieselguhr except when using hydrofluoric acid or the like and the gas mixture (acetylene and hydrochloric acid) is forced in and then the diluent gas to increase the pressure, or the porous mass may be previously wetted with an inert diluent and with the mixture of acetylene and hydrochloric acid and gas in molecular proportions which may be liquefied by cooling. The condensation takes place under the pressure of the mixture itself owing to the heat absorbed by the surroundings and no further addition of heat is required; further polymerization however can be effected by heating. The vinyl chloride can be obtained from the reaction products for instance by extraction by chlorbenzene.

Hydrobromic, hydriodic or hydrofluoric acid can be employed instead of hydrochloric acid, when the corresponding vinyl halides are formed still more readily than with hydrochloric acid gas and by using heat and/or fairly high pressure, the polymerization products can be obtained almost quantitatively.

Example 2.

54 parts of crotonylene $CH_3.C.C.CH_3$. are treated with 36.5 parts of hydrochloric acid gas under pressure as in Ex. 1. Almost quantitatively, a reaction product of the net formula $C_4H_7Cl$. is obtained first, having the probable constitutional formula, $CH_3.CH:CCl.CH_3$. and finally a polymerization product of the formula $(C_4H_7Cl)n$, From the latter a substance resembling rubber can be obtained by the action of metallic sodium or calcium in an inert organic solvent. Also the other halogen hydrides behave in a similar manner with crotonylene and furnish analogous products.

Example 3.

40 parts by weight of allylene $CH_3.C:CH$. and 36—38 parts by weight of dry hydrochloric acid gas are caused to interact under the conditions specified in Example 1. An addition of hydrochloric acid to allylene occurs first forming 80—85% of $\beta$-chlorpropylene and 10—15% of propylene monochloride. The $\beta$-chlor-propylene can be completely polymerized by further heating. $\beta$-chlor-propylene $CH_2:CCl.CH_3$ also polymerizes when it stands in the air at about 20° C. for from 4—6 months or if it is subjected to ultra-violet radiation. The polymerization products can be employed direct for the manufacture of varnishes or the like or by removal of the halogens can be transformed into a rubber-like substance.

Rubber-like substances can be obtained direct under pressure by the action of sodium, zinc and especially of magnesium and calcium and in presence of inert organic liquids.

The condensation of allylene with the other halogen hydrides occurs still more readily. It has been found possible not only to condense acetylene hydrocarbons in the above described manner with halogen hydrides, but also with methyl chloride as illustrated in the following example.

Example 4.

51.1 parts by weight of methyl chloride and 26 parts by weight of acetylene are forced into an autoclave at a pressure of 1—2 atmospheres; this pressure can then be increased by means of nitrogen to 10—15 atmospheres; the mixture is heated for from 5—10 hours at 250—350° C. The product so obtained is extracted with chlorbenzene or the like solvent. A chlorinated hydrocarbon of the net formula $C_3H_5Cl$ is then formed in almost quantitative yield; the probable constitutional formula is $CH_3.CH:CH\,Cl$.

On further heating or by using higher pressures, one obtains only a polymerization product of this hydrocarbon which likewise gives a rubber-like substance on heating with metallic sodium.

In the same way an addition of methyl chloride to allylene is possible.

The addition takes places in the following two directions (1) 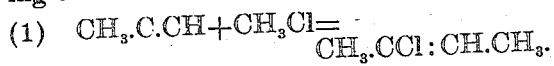

(2) 

Total yield about 90%. The bodies 1 and 2 are in the proportion of about 70 to 75.

On subsequent removal of hydrochloric acid, the chief product is crotonylene and as by-product, a hydrocarbon with two double bonds, of the formula $C_4H_6$. By the action of metallic sodium, with heat, the polymerization product is transformed into a rubber-like substance. In the above described example the process is discontinuous. If the polymerization product is not the chief object, but if it is only desired to obtain the addition product, the following apparatus gives much more satisfactory results for technical operation since continuous operation is possible therewith. This modification of the invention is illustrated in the following example in which the apparatus is of great importance.

*Example 5.*

A mixture of molecular quantities or equal volumes of acetylene and hydrochloric acid gas is forced by a compressor under a pressure of 3—15 atmospheres into a thick walled ferro-silicon tube covered with lead and of a spiral or zig-zag form of about 3—5 metres long; this tube is built into a steel mantle and superheated steam is passed thereover at 150—250° C.

The end of the steel tube projects from the steel mantle and is provided with a safety valve which can be adjusted to a pressure of 1—50 atmospheres by regulation of a spring or a lever. The gases which escape above this pressure pass into a distillation apparatus with tubes and into a cooling apparatus. At the other end of the spiral tube, a non-return valve is provided at the inlet.

If now the tube is filled with the gas mixture, it is heated when the pressure rises. If for example the outlet valve is loaded to 5 atmospheres, this will open as soon as the pressure exceeds 5 atmospheres and the excess pressure will be relieved. If the pressure generated by the compressor is only slightly above 5 atmospheres, small quantities of fresh gas mixture will be slowly forced in through the non-return valve, but larger quantities of gas will be introduced in the same time if the compressor pressure is considerably greater. This affords a certain control for the introduction of gas so that the whole process runs continuously. At 5 atmospheres pressure in the tube and at 5½ atmospheres pressure in the compressor, about 25% of vinyl chloride is formed in a single passage through the tube. The final product so obtained consists of vinyl chloride and acetylene and hydrochloric acid gas which have not interacted, together with small quantities of other condensation and/or polymerization products. The gas mixture which escapes is first cooled by cooling apparatus to ordinary temperatures and then in a freezing machine or the like to —20° to —25° C. The vinyl chloride is then condensed to a liquid while the acetylene and hydrochloric acid remain in the gaseous form and are again supplied to the reaction tube. The liquid vinyl chloride so obtained is purified by distillation after neutralization of the hydrochloric acid and is then approximately pure. 90—96% of the total quantity of the gas mixture can be transformed into the chloride in this manner.

The continuous condensation of acetylene hydrocarbons and halogen hydrides or methyl chloride to vinyl compounds can also be effected in presence of inert gases such as nitrogen or carbon dioxide and an addition of inert oxygen-free hydrocarbons, such as benzene, toluene, xylene, benzine, petroleum, etc., is particularly suitable; they may be added in larger or smaller quantities to the gas mixture in the vapour form. This mixture is then passed into the reaction tube in the compressed state. The presence of the above mentioned substances allows of the employment of a much higher temperature so that the reaction velocity and yield are considerably increased without incurring the danger of explosion of acetylene. If methyl chloride is to be treated in the same apparatus, the temperature must be raised to 250°—350° C.; otherwise the conditions are similar.

Obviously the examples are illustrative and the quantities, times, temperatures, and pressures may be suitably varied. Other methyl halides may be used.

The invention also includes processes based on the discovery that in the same way it is possible to condense organic carboxylic acids with hydrocarbons of the acetylene series. It could not have been foreseen that the much weaker organic carboxylic acids would interact with acetylene to form esters of vinyl alcohol by the aid of increased pressure, even in the absence of catalysts.

It has been proposed to prepare esters of vinyl alcohol and of ethylidene glycol by treating acetylene with organic acids in presence of mercury salts. The use of mercury salts as catalysts has the disadvantage of increasing the expense and difficulty of the process and the process is not continuous since the mercury salts are gradually reduced to metal when their catalytic activity is impaired.

It has been found however that as the result of comparative experiments, the process proceeds in a much more simple manner by the application of pressure and the reaction takes place more smoothly than by the methods hitherto known. It has further been found that the process can be accelerated by the addition of certain other metals or compounds thereof. It was not known that in addition to mercury salts, certain other substances were active catalysts, e. g. metallic magnesium, tin, copper or compounds of these metals, or iodine, hydriodic acid, boron compounds, and organic substances, e. g. anhydrides or super-oxides.

The reaction only occurs at an increased pressure and not at ordinary pressure in the above mentioned cases. The above mentioned accelerators are to be preferred to mercury salts on account of their greater stability since the mercury salts are reduced during the reaction and must be regenerated by a difficult process which is quite unnecessary for the above mentioned substances.

The process is of particular value since by its aid it is possible to obtain the technically important polymerization products of vinyl esters without previous isolation of the esters themselves. Valuable polymers of the esters are obtained by increasing the pressure and/or temperature and/or prolonging the time of reaction.

It has hitherto been proposed to prepare polymerization products or organic vinyl esters but such proposals have started in every case from the esters themselves which were polymerized by heating, illumination or the like, whereas according to the process of the present invention, the desired polymers can be obtained from acetylene and a carboxylic acid in a single operation without the necessity of isolating the intermediate products, viz, the vinyl esters. This feature of obtaining the polymer in a single operation without isolation of the ester is considered broadly novel and of great importance.

This modification of the invention will be illustrated by the following examples:—

Example 6.

26—28 parts by weight of dry acetylene are introduced in small portions into a mixture of 50 parts by weight of anhydrous acetic acid and 1 part of acetic anhydride contained in a sufficiently pressure tight vessel. The mixture is gradually heated to about 40—60° C.

If this mixture is allowed to stand for several hours while kept warm and under pressure which can be maintained at about 5 atmospheres by introduction of an inert gas such as nitrogen, the acetylene is absorbed by the acetic acid giving about 75 parts by weight of the vinyl ester of acetic acid with 3—5 parts by weight of ethylidene diacetate according to the following equations:

(1) 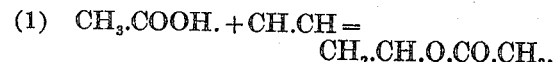

(2) 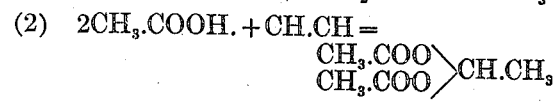

The first product is obtained by fractional distillation. The yield of the latter can be increased by addition of larger quantities of acetylene, e. g. from 60 parts by weight of acetic acid and 56 parts by weight of acetylene, about 90—95 parts of ethylidene acetate are obtained and only 5—10 parts by weight of the vinyl ester of acetic acid. The products can be readily separated from one another and from any unchanged acetic acid by fractional distillations.

Example 7.

After the quantities of acetylene specified in Example 6 have been allowed to interact with the acetic acid and the acetylene is absorbed, the mixture is heated more strongly and the pressure is increased at the same time. At a temperature of about 120—200° C. and a pressure of 10 atmospheres or more, the ester first formed is completely transformed into the polymerized form and obtained as a more or less tough mass.

By varying the pressure, temperature and time of reaction, the final product can be obtained in different degrees of polymerization and correspondingly of different consistency, e. g. semi-liquids to solids, or more or less tough.

Suitable vinyl compounds can be obtained not only from acetic acid but also from the oxy, amido and chloro derivatives of acetic acid and also from aryl derivatives thereof. Similar esters are also obtained from propionic acid.

The carboxylic acids of the aromatic series can also be employed. Acetylene can be condensed in like manner with di-valent or trivalent alcohols or with chlorhydrins.

In a similar way it is possible to condense other hydrocarbons of the acetylene series, e. g. allylene with carboxylic acids or the like or to polymerize the addition products in a single operation.

The process can also be performed continuously in an apparatus such as that previously described.

In the claims it is stated that the reaction is continued until a solid polymerization product is obtained. Examples of suitable times, pressures and temperatures of condensation have been given, and in general it will be apparent that it is necessary to perform the reaction at a higher temperature or pressure, or for a longer time, than would be required for obtaining the unpolymerized product. The essential feature of the invention consists in obtaining the solid product without isolation of the volatile intermediate product and the conditions may obviously be varied within the limits of this requirement.

Having now particularly described and ascertained the nature of my said invention, and in what manner the same is to be performed, I declare that what I claim is:—

1. The process of producing vinyl polymerization products which comprises heating under pressure a gas of the acetylene series with a body capable of forming a vinyl ester therewith, and continuing the reaction until a solid polymerization product is obtained, without preliminary isolation of the vinyl ester.

2. The process of producing vinyl polymerization products which comprises heating acetylene under pressure with a body capable of forming a vinyl ester therewith and continuing the reaction until a solid polymerization product is obtained without preliminary isolation of the vinyl ester.

3. The process of producing vinyl polymerization products which comprises heating under pressure a gas of the acetylene series with an acid and continuing the reaction until a solid polymerization product is obtained without preliminary isolation of the vinyl ester.

4. The process of producing vinyl polymerization products which comprises heating under pressure a gas of the acetylene series with a halogen acid and continuing the reaction until a solid polymerization product is obtained without preliminary isolation of the vinyl ester.

5. The process of producing vinyl polymerization products which comprises heating under pressure in absence of a catalyst a gas of the acetylene series with a body capable of forming a vinyl ester therewith, and continuing the reaction until a solid polymerization product is obtained without preliminary isolation of the vinyl ester.

In witness whereof, I have hereunto signed my name this 30 day of Dec., 1920, in the presence of two subscribing witnesses.

HERMANN PLAUSON.

Witnesses:
   HUTON BERNSTINE,
   W. S. G. BEERTON.